United States Patent [19]

Sato

[11] Patent Number: 4,706,096
[45] Date of Patent: Nov. 10, 1987

[54] UNIT TYPE THERMAL LABEL PRINTER

[75] Inventor: Yo Sato, Tokyo, Japan

[73] Assignee: Kabushiki Kaisha Sato, Japan

[21] Appl. No.: 875,278

[22] Filed: Jun. 17, 1986

[30] Foreign Application Priority Data

Jun. 26, 1985 [JP] Japan .................................. 60-137859

[51] Int. Cl.⁴ ........................ G01D 15/10; B65C 9/18; B41J 3/20; G06K 19/00
[52] U.S. Cl. ............................... 346/76 PH; 346/136; 101/93.04; 101/288; 101/66; 156/384; 156/577; 156/579; 156/DIG. 47; 156/DIG. 49; 156/DIG. 51; 235/385; 235/432; 235/487; 235/488; 400/73; 400/103; 400/120
[58] Field of Search .......................... 346/76 PH, 136; 101/93.04, 93.05, 288, 291, 292, 66; 156/384, 570, 577, 579, 584, DIG. 51, DIG. 47, DIG 48, DIG. 49; 235/378, 383, 385, 432, 472, 487, 488, 494; 400/120, 73, 103

[56] References Cited

U.S. PATENT DOCUMENTS 4,268,179 5/1981 Long et al. ........................... 400/120
4,415,065 11/1983 Sandstedt .......................... 186/39 X
4,584,048 4/1986 Hamisch, Jr. et al. ............. 156/384

Primary Examiner—E. A. Goldberg
Assistant Examiner—Gerald E. Preston
Attorney, Agent, or Firm—Ostrolenk, Faber, Gerb & Soffen

[57] ABSTRACT

This invention relates to a unit type thermal label printer capable of receiving and transmitting data. The unit type thermal label printer is comprised of detachable components consisting of a label printer unit, a data terminal unit, an applicator unit, and a handle unit. These units can be partially or completely connected and disconnected as desired thereby enabling the device to be configured according to the particular needs of the user and the situation.

14 Claims, 7 Drawing Figures

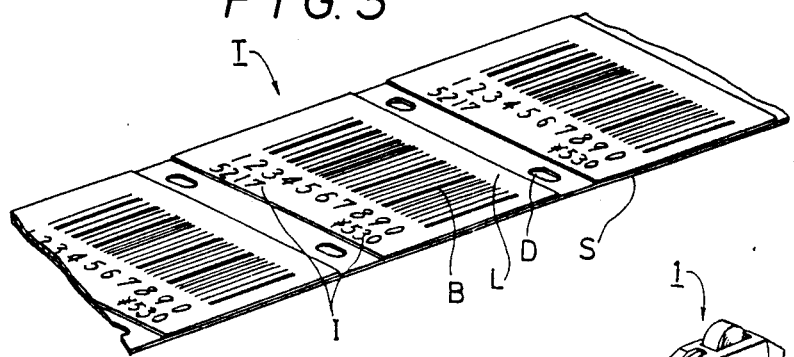
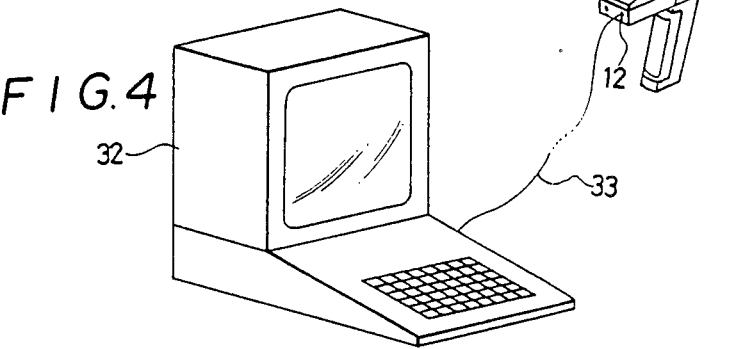
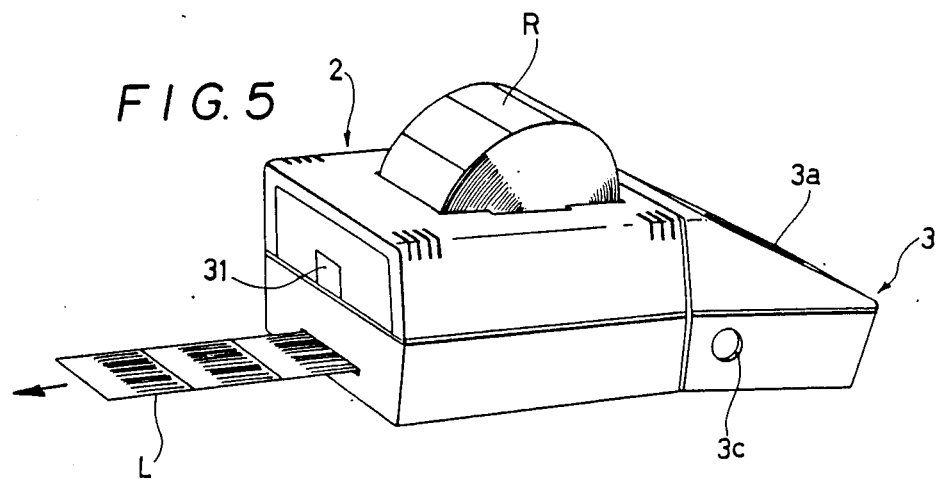

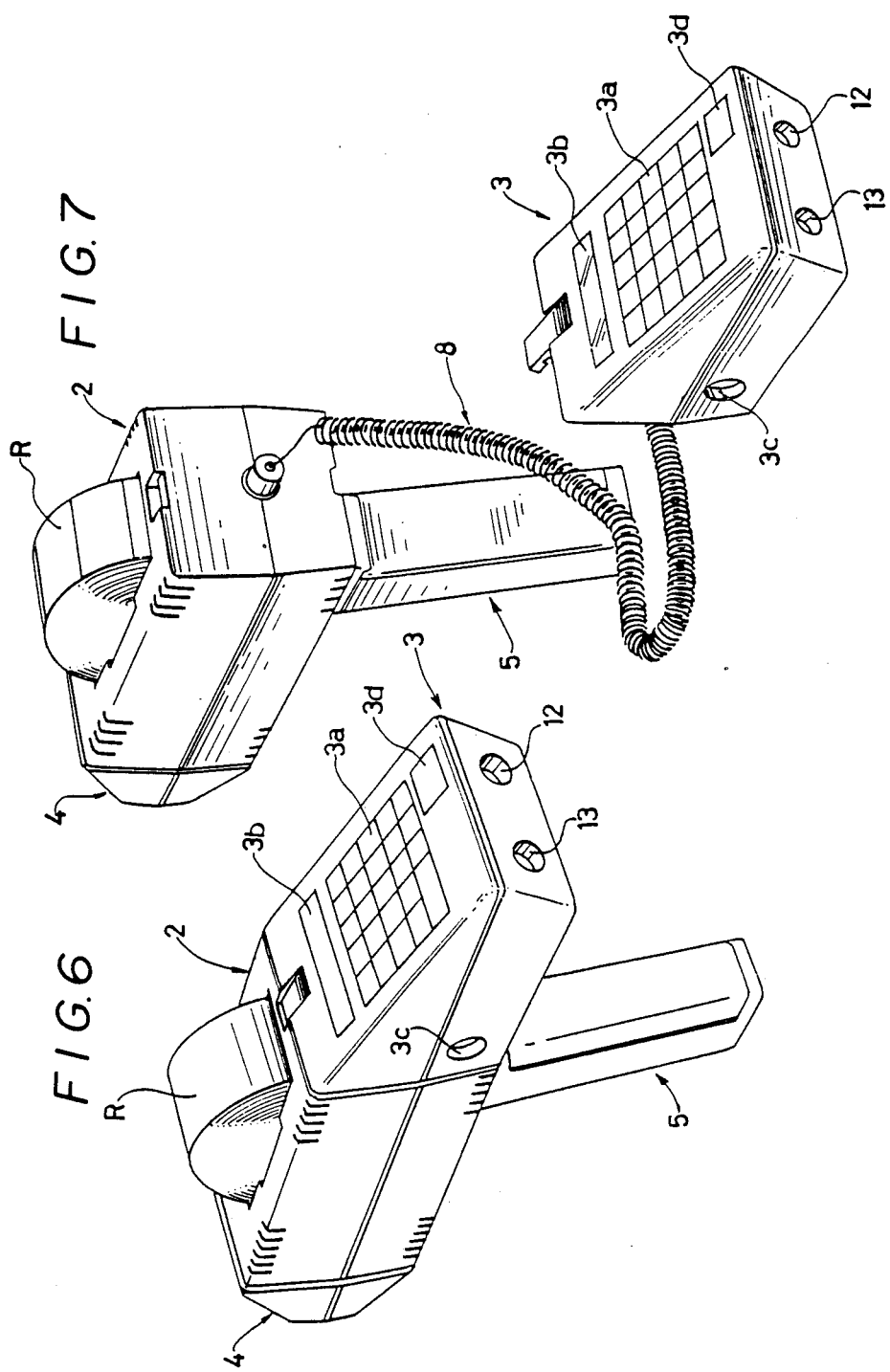

UNIT TYPE THERMAL LABEL PRINTER

BACKGROUND OF THE INVENTION

This invention relates to a unit type thermal label printer capable of receiving and transmitting data, and more particularly to a unit type thermal label printer which is comprised of a label printer unit, a data terminal unit, an applicator unit, and a handle unit, which can be interconnected as desired.

Label printers and label printer applicators for printing price tags and various other indicators are manufactured in accordance with individual purposes and functions. Therefore, a single user has to be equipped with different label printers and label applicators when the location or mode of use changes. This is inconvenient, and requires the manufacture and purchase and use of a range of different different label printers and applicators, all of which necessarily have similar functions.

SUMMARY OF THE INVENTION

An object of the present invention is to provide a unit type thermal label printer which is separable into functional elements. It is another object to produce a thermal label printer which can be dynamically adapted for use at different places and times, and in different configurations.

The present invention attains this object by providing a unit type thermal label printer formed of separable thermal label printer elements, a label printer unit, a data terminal unit, an applicator unit, and a handle unit. These units are freely electrically and mechanically connectable.

The present invention provides a modular unit type thermal label printer which is comprised of a label printer unit for thermal character printing and a data terminal unit. The data terminal unit is electrically and mechanically attachable with, and detachable from, the label printer unit. An applicator unit is mechanically connectable to the label printer unit for the application of adhesive backed labels. A handle unit is mechically detachable from and connectable to the label printer unit that is used for hand held operation.

BRIEF DESCRIPTION OF THE DRAWINGS

FIG. 3 is a perspective view of a segment of a label strip;

FIG. 4 is a view illustrating the thermal label printer of the present invention connected to a microcomputer;

FIG. 5 is a perspective view of a data terminal unit connected to the label printer unit of the present invention;

FIG. 6 is a perspective view of the label printer unit, data terminal unit, applicator unit, and handle unit connected together; and FIG. 7 is a perspective view of the data terminal unit disconnected from the label printer unit.

DESCRIPTION OF THE PREFERRED EMBODIMENT

Figure 1:
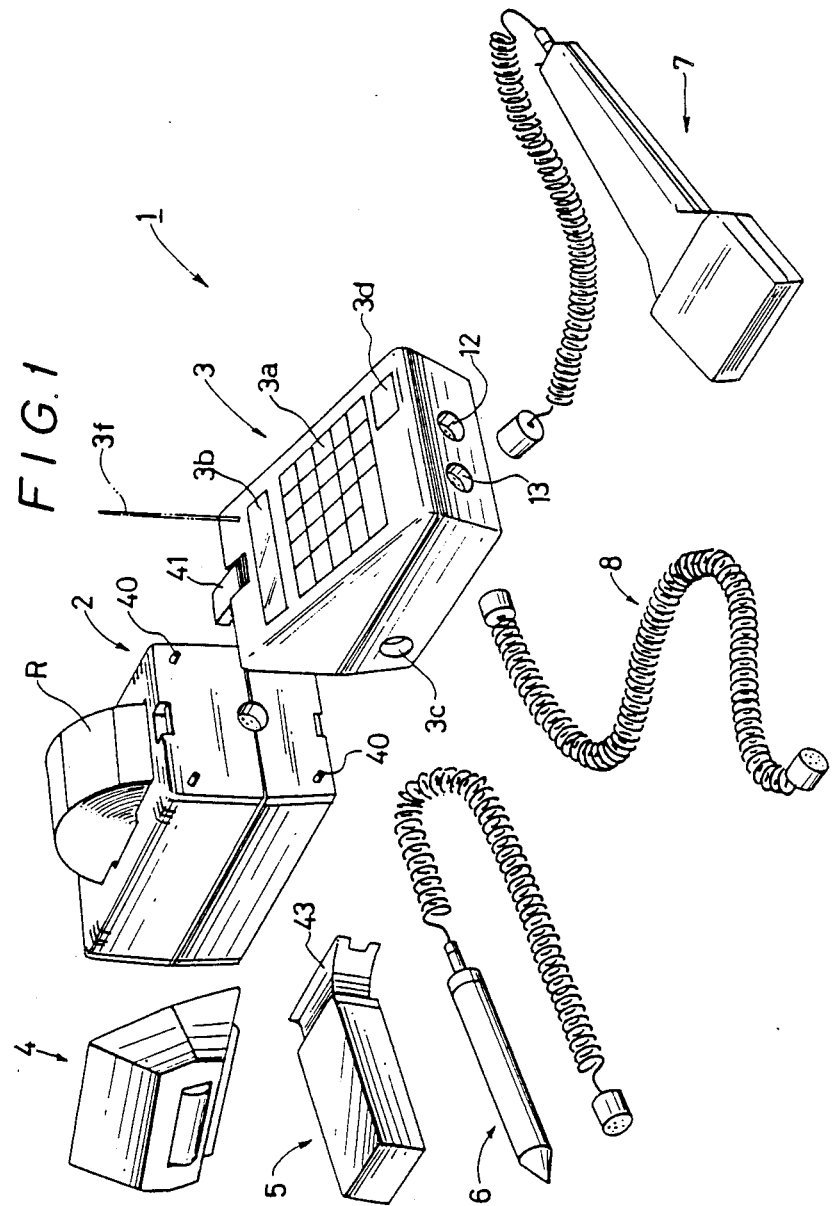
FIG. 1 is a perspective view of the unit type thermal label printer and accessories according to the present invention, shown disconnected.

With reference to FIG. 1, the thermal label printer 1 comprises a main or label printer unit 2, data terminal unit 3, applicator unit 4, and handle unit 5. There are accessories comprising a pen scanner 6 and touch scanner 7 for reading data. Cable 8 is used for connecting label printer unit 2 to data terminal unit 3. Data input to data terminal unit 3 is performed by scanning optically readable data with pen scanner 6 or by touching the data with touch scanner 7.

Figure 2:
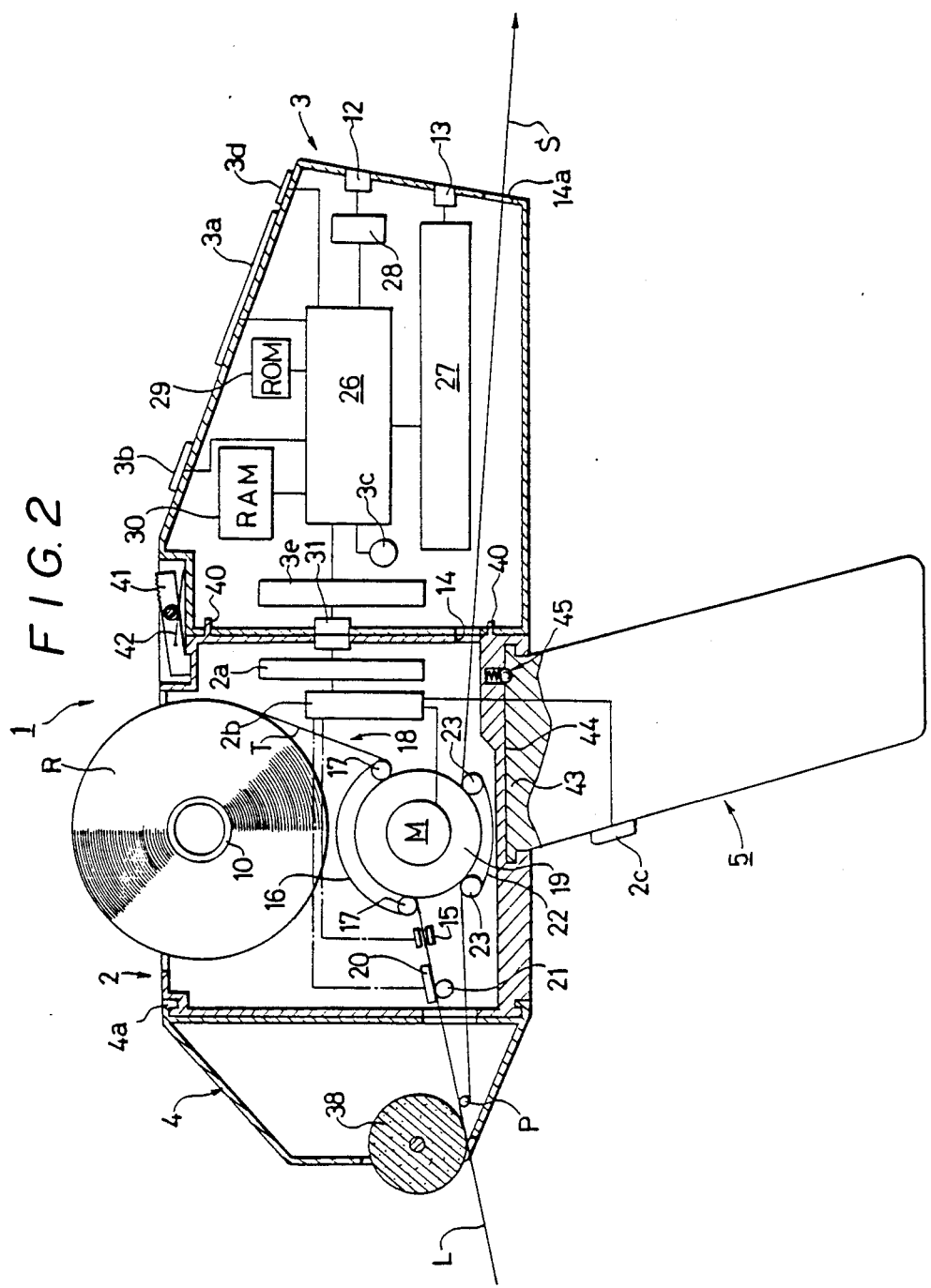
FIG. 2 is a sectional side view of the assembled embodiment of FIG. 1 showing its internal structure.

As shown in FIG. 3, label strip T includes backing sheet S which is coated with a separating agent. A plurality of labels L, are each coated with an adhesive, detachably adhered continuously along the length of label strip T. On the labels L of the thermal label strip T, there is printed information I in the form of bar code B which may represent information such as a merchandise or manufacturing code, a department code or a price. Backing sheet S is provided with holes D which are used for strip T position detection purposes. The holes D can also be utilized for conveyance purposes by engagement with conveyor roller 19 (FIG. 2).

The internal structure of printer 1 along with printer unit 2, data terminal unit 3, applicator unit 4, and handle unit 5, all assembled will now be described with reference to FIG. 2.

The thermal label strip T passes from thermal label roll R on support member 10 into label strip passage 18 via guide rollers 17 of an upper press member 16.

Thermal label strip T passes via conveyor roller 19 and position sensor 15 to thermal print head 20 and platen 21. The strip T is redirected at platen 21 around bending pin P where labels L are peeled off. Therefore, just the backing strip S is directed back for engagement with conveyor roller 19, guided by guide rollers 23 of lower press member 22. The backing sheet S is fed out from data terminal unit 3 via discharge outlet 14a.

Conveyor roller 19 is driven by the stepped rotation action of stepping motor M so as to move the thermal label strip T in the required direction for printing and conveyance.

Data terminal unit 2 houses control circuit 26, which is connected to battery 27, interface 28, ROM program memory 29, RAM data memory 30, and keyboard 3a which includes a power switch. The interface 28 is used for data input from and output to external devices not shown while ROM 29 is used to store communication and control programs. Display 3b, socket 3c which is used for scanners 6 and 7, print switch 3d, and printer unit 2 are also connected by interface 3e and controlled by control circuit 26.

The interface 3e is connected to interface 2a of printer unit 2 via socket 3c for linking printer unit 2 to data terminal unit 3. The sensor 15, thermal print head 20, stepping motor M and print switch 2c are connected to an auxiliary control circuit 2b which is connected to interface 2a.

The control circuit 26 controls data input/output operations and general control or overhead functions. Auxillary control circuit 2b controls printing and label conveyance for printing. The battery 27 is preferably a rechargeable type and can be connected, via socket 13, to an external battery charger (not shown).

FIG. 4 shows thermal label printer 1 connected to a microcomputer 32 so as to allow data I/O operations therebetween. Data can be transferred to or received from microcomputer 32 via socket 12 and cable 33. An acoustic coupler may also be used to link the printer 1 to host a computer via telephone by a wired or wireless link (not illustrated). Data input/output operations can be carried out by radio with the provision of an antenna 3f on data terminal 3, and as indicated in phantom in FIG. 1.

The applicator unit 4 is provided with bending pin P and application roller 38, and can be mechanically attached to and detached from printer unit 2 by means of an engaging projection 4a. The printer unit 2 is provided with a pair of engaging pins 40 on the side facing the data terminal unit 3. An engaging member 41 is pivotably attached to the upper front edge of data terminal unit 3, and by use of spring 42, can be engaged with and disengaged from, an engaging portion provided on the printer unit 2. The top of handle unit 5 is provided with a dovetail portion 43 which can be engaged with and disengaged from a dovetail groove 44 provided on the lower part of printer unit 2. The handle unit 5 is lockable into place by lock 45. It is to be understood that the mechanical connections of various units are not restricted to those shown in the drawings but rather components can be adapted as desired to form a configuration that is in line with individual or specialized requirements.

FIGS. 5 to 7 show some of the formats that can be accomplished by combining units 2, 3, 4, and 5, scanners 6 and 7, and cable 8. FIG. 5 shows an example of the data terminal unit 3 connected to label printer 2 for desk-top type applications. There, the thermal label strip T only engages with conveyor roller 19 at the top portion thereof. Labels L are therefore fed out of the front of the printer unit 2, together with backing sheet S so that the labels L can be peeled by hand and applied to an object.

With the type of application shown in FIGS. 6 and 7, labels are printed by operating switch 2c (shown in FIG. 2). For the configuration shown in FIG. 5, switch 3d (shown in FIG. 2) is used to print labels.

Thus, through the use of printer 1, various units can be combined together so that data input/output and printing of labels for different applications can be done. Therefore when printing labels of different sizes, different printer units corresponding to different sizes of desired labels may be chosen. This gives printer 1 a wide range of applicability. Additionally, there are also service and maintenance benefits, since only the broken unit needs to be replaced.

Some of the potential applications for the present thermal printer include labelling and reordering of merchandise and inventory control at retail outlets, management of business data files, printing of blood data cards and sample tube labels at blood banks, printing of bar code labels for patient charts and medical certificates at hospitals and clinics, process, parts and inventory control in factories, printing of freight confirmation labels at parcel reception/dispatch points, management of customer data, and data and printing of labels relating to outside suppliers at department stores and supermarkets.

The thermal label printer according to this invention is therefore not limited to data input/output functions. By providing great flexibility in the printing of labels, the thermal label printer is applicable to a great many fields, and offers better economic efficiency.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:
1. A modular thermal label printer, comprising:
an independently operable and hand held data terminal unit including data memory means for storing data therein, a program memory means for storing a sequence of instructions therein and an input/output means for providing data communication with other devices external to said data terminal unit, control means connected to the above mentioned means for controlling said means of said data terminal unit, said data terminal unit being effective for storing therein information that is to be printed on labels;
a hand held label printer unit for printing on thermal labels;
a label strip transport means, in the label printer, for transporting a strip of the labels past said printer unit;
electrical connection means, disposed on both said label printer unit and said data terminal unit, for connecting the data terminal unit and the label printer unit to one another; and
mechanical connection means, disposed on both said label printer unit and said data terminal unit, for enabling the data terminal unit and the label printer unit to be selectively and directly, mechanically interconnected with one another in a manner which combines the label printer unit and the data terminal unit into a single, integrated and hand held label printer.

2. A modular unit type thermal label printer according to claim 1, further comprising, a handle unit which is attachable to and detachable from said label printer unit for facilitating hand held and desk type operation respectively of said unit type thermal label printer.

3. A modular type thermal label printer according to claim 1, further comprising an applicator unit connectable to and detachable from said label printer unit, for facilitating the application of said thermal strip labels said transport means feeding labels to said applicator unit.

4. A modular unit type thermal label printer according to claim 1, wherein the thermal label strip is comprised of a label adhesively applied to a backing sheet and further comprising an applicator unit having a label peeling member for separating the labels from the backing sheet, said applicator unit further having a label application member for facilitating the application of the labels, said transport means feeding the labels to said applicator unit.

5. A modular thermal label printer according to claim 1, further comprising a support means for supporting a roll of the thermal strip labels in said label printer unit;
detection means for detecting the position of the labels being transported;
print head means disposed in said label printer unit for printing on the thermal strip labels as they are being transported therepast; and
an input device for reading printed predetermined information.

6. A modular thermal label printer according to claim 1, wherein the mechanical connection means at the data terminal unit comprises a first contact surface and the mechanical connection means at the label printer unit comprises a second contact surface and the first and second contact surfaces mate with each other.

7. A modular thermal label printer according to claim 6, wherein the first and second contact surfaces have generally equal surface area to give the module thermal label printer an integrated appearance.

8. A modular thermal label printer according to claim 1, wherein the data terminal unit is mechanically separated from the label printer unit and further comprising an electrical cable connected, respectively, to the electrical connection means of the data terminal unit and the label printer unit for effecting direct electrical connection therebetween.

9. A modular unit type thermal label printer according to claim 5, wherein the thermal label strip is comprised of a label adhesively applied to a backing sheet and further comprising an applicator unit having a label peeling member for separating the labels from the backing sheet, said applicator unit further having a label application member for facilitating the application of the labels, said transport means feeding the labels to said applicator unit.

10. A modular unit type thermal label printer, according to claim 5, further comprising a handle unit which is attachable to and detachable from said label printer unit for facilitating hand held and desk type operation respectively of said unit type thermal label printer.

11. A modular unit type thermal label printer, according to claim 9 further comprising a roll of thermal strip labels, said labels being thermally sensitive.

12. A modular unit type thermal label printer, according to claim 5, further comprising a roll of thermal print labels, said labels being thermally sensitive and further being attached to a backing sheet.

13. A modular unit type thermal label printer according to claim 5, wherein said input device is comprised of an optical input device.

14. A modular unit type thermal label printer, according to claim 13, wherein said optical input device comprises a pen scanner.

* * * * *